United States Patent [19]
Kivlen et al.

[11] 3,812,663
[45] May 28, 1974

[54] HARVESTING APPARATUS

[75] Inventors: John A. Kivlen, Altamonte Spring; Richard L. Orr, Winter Park; William H. Schwab, Fern Park, all of Fla.; George F. Macindoe, New Foundland, N.J.

[73] Assignee: Ashland Company of N.J, Inc., Newfoundland, N.J.

[22] Filed: Nov. 30, 1972

[21] Appl. No.: 310,907

Related U.S. Application Data
[63] Continuation of Ser. No. 39,372, May 21, 1970, abandoned.

[52] U.S. Cl. .................................... 56/328 R
[51] Int. Cl. ................................. A01g 19/08
[58] Field of Search....... 56/328, 329, 330, 233–237

[56] References Cited
UNITED STATES PATENTS

| | | | |
|---|---|---|---|
| 153,033 | 3/1866 | Oliver | 56/235 |
| 3,006,130 | 10/1961 | Jones | 56/328 TS |
| 3,200,575 | 8/1965 | Hurst | 56/328 R |
| 3,425,202 | 2/1969 | Setzer | 56/328 R |
| 3,426,517 | 2/1969 | Duncan, Sr. | 56/330 |
| 3,439,481 | 4/1969 | Hall | 56/328 R |
| 3,451,202 | 6/1969 | Murray | 56/328 R |
| 3,491,521 | 1/1970 | Danford | 56/328 R |
| 3,514,936 | 6/1970 | Grover | 56/330 |
| 3,522,696 | 8/1970 | Millier et al. | 56/328 R |
| 3,561,204 | 2/1971 | Carson | 56/328 R |

Primary Examiner—Russell R. Kinsey
Attorney, Agent, or Firm—Arthur A. March

[57] ABSTRACT

The present invention involves a harvesting apparatus for harvesting the crop from trees or bushes. Generally the harvesting apparatus comprises a movable platform to which an upstanding support is affixed. The support carries an elongate mast provided with rigid extending arms. The arms are injected into the tree or bush in such fashion as to grab the foliage and/or the secondary limbs and a substantially vertical vibratory movement is imparted through the mast and arms to remove the mature crop from the tree without measurably disturbing the immature fruit on the tree or causing any injury to the tree itself.

13 Claims, 7 Drawing Figures

PATENTED MAY 28 1974 3,812,663

HARVESTING APPARATUS

This is a continuation of application Ser. No. 39,372 filed May 21, 1970 and which is now abandoned.

This invention relates to harvesting equipment and more particularly to a mechanical mass removal harvester for harvesting crop from trees and bushes. The present invention is usable in many areas of the tree and bush crop industry. Therefore, while the invention is hereinafter described in connection with the harvesting of citrus and particularly citrus trees, in order to be concise, it is to be understood that such description is not to be in any way construed as a limitation on the scope of the invention.

BACKGROUND OF THE INVENTION

While mechanization has been accomplished in most areas of the citrus industry, hand labor has been required in order to pick the fruit from the tree. This practice continues despite the scarcity of such labor and the attempts over several generations on the part of industry and research projects to provide a satisfactory mechanical harvester.

A large variety of mechanical devices have been proposed to detach the fruit from the trees, all without measurable success. The difficulties encountered have heretofore proven insurmountable. This is particularly true in connection with the harvesting of oranges where, in the case of the major crop, viz., Valencias, the ripened and mature fruit is ready for harvesting while a second growth of immature fruit is still on the tree. In order to attempt to overcome the problems many years of research and testing have taken place with machines designated as "contact removal" harvesters and "mass removal" harvesters.

The "contact removal" harvesters attempted to duplicate the work of a picker and usually consist of a picking head to detach the fruit and a positioning mechanism to place the picking head in immediate proximity of the fruit to be harvested. It has been found, however, that such harvesters could not reach far enough into the tree to obtain the fruit and in certain instances the young fruit was removed from the tree along with the mature fruit. Also, of prime importance, the rate of harvesting was extremely slow, whereby such harvesters were completely uneconomical.

The "mass removal" harvesters proposed heretofore produced a vibrational force by shaking the entire trunk of the tree or the major limbs with a lateral oscillating movement either by directly gripping the trunk or major limbs or by emitting a pulsating air blast directed at the tree. Such harvesters have proven unsatisfactory in that they caused injury and damage to the tree and the root system. In addition, because of the forces exerted, either by vibration or the force of air, the young fruit as well as the leaves were dislodged along with the mature fruit causing irreparable damage to the ensuing crop and to the tree itself. Furthermore, in the heretofore proposed mass removal harvesters, the amount of vibratory force required is such that some fruit is removed from virtually all sections of the tree at the same time, thus requiring complex and impractical catch frame structures which must be placed under the entire tree if the fruit is to be caught. As a consequence, both the contact removal harvesters and mass removal harvesters heretofore described are not generally used by the citrus industry and hand labor was used despite the attendant problems.

Recently, there has been presented a new and novel concept which provided vertical movement of the foliage around the fruit or through the secondary limbs. As a consequence of this breakthrough it has been found that the mature fruit may be virtually completely harvested efficiently, economically and in a short time without doing damage to the tree itself or the root system and not significantly disturbing the growth of the young fruit. The benefits to be derived by imparting a vertical vibratory movement to mass foliage and secondary limbs have now been well recognized.

The present invention deals with this latter concept and involves means whereby the foliage in large sections of the tree from top to bottom may be engaged by the shaking element and with vertical motion imparted thereto causing the harvesting of the mature fruit while not materially affecting the young fruit, the tree or the root system.

GENERAL DESCRIPTION

The present invention seeks to utilize the extremely advantageous concept of the general form of unit last mentioned. The unit herein to be described comprises a multiplicity of arm members carried upon an elongate upright mast which extends in a direction generally normal to the supporting means. The arm members are placed apart at some suitable spacing distance in order that the unit as a whole may be brought up close to the tree with such arms extended inwardly from the outermost portion of the foliage. Usually there are a substantially large number of vertically spaced arms which extend inwardly and which, in the lower regions, are generally parallel to each other and in the upper regions are tilted downward so as to force inwardly toward the free from its upper portions from which the harvest is to be gathered.

Certain of the arms are held at all times in such a way that they retain their original relative position in respect of the supporting mechanism. It is possible to induce vertical vibration sufficient to dislodge the mature fruit merely by the engagement of the arms with the foliage and/or secondary limbs and without grasping the foliage and/or secondary limbs between the arms. However, preferably when the unit is so positioned that these last named arms extend within the tree, the next adjacent arm may then be moved, if desired, so that it can be brought toward one of the stationary arms thereby generally to confine within the arms, the foliage and the smaller branches which serve to hold the fruit. In this way any two adjacent arms are brought relatively close together at their outer ends, and at their inner ends the original spacing is generally maintained. When the arms are so positioned relative to the tree and held in a position of securement to the supporting mechanism, it will be evident that an appropriate drive can be used to move the complete arm assembly up and down in a reciprocating fashion. When this is done, the branches or foliage sections then are subjected to a reasonably rapid shaking motion which is sufficient to shake the oranges or other fruit from the tree and to permit them to fall into the catch frame. The shaking motion can be accomplished at any desired rate and is usually achieved from a drive mechanism which moves the complete assembly of arms up and down, and in so doing accomplishes the removal of the fruit.

The arms from the base of the mast to near the top are preferably constructed so that the movable arms close upwardly to engage the foliage at an angle. At its top, the mast or supporting mechanism for the unit is preferably offset inwardly toward the tree and the movable arms close in a downward direction. This is done because the upper branches and foliage do not extend out as far as the lower branches, and thus harvesting from the upper section of the tree normally becomes much more difficult, but with the inward positioning of the reciprocating drive and the slight change in the arm position prior to bringing any two adjacent arms together, it is adequate to engage a sufficient number of branches together with the foliage to achieve the desired objective.

The mechanism is such that it can readily be carried upon a transportable vehicle, and usually a movement of this vehicle to three to six different positions about the tree is sufficient to confine an adequate number of branches to remove by the shaking action practically all of the mature fruit at any one sequence of operation. The unit, therefore, is one which can, within an extremely short time, remove most of the fruit from a tree which otherwise would require a long period of time to harvest. The drive mechanism can be so constructed that costly maintenance is normally avoided.

With the foregoing in mind, it is an object of this invention to provide shaker apparatus applicable for harvesting fruit products from trees which will achieve its objective substantially without damage either to the tree proper, its limbs, or the fruit which it bears.

Another object of the invention is to provide an elongate vertical shaker mechanism for dislodging mature fruit from a tree which is relatively inexpensive, easily transportable, and generally free from any excess number of moving parts.

Still another object of the present invention is to provide a harvesting apparatus which will harvest at least 90 percent of the mature fruit while not materially disturbing the young fruit, tree or the root system.

Still a further object of the present invention is to provide harvesting apparatus in which the fruit is removed from only selected portions of the tree without affecting the removal of fruit from other portions, thereby enabling the use of a single, practical and economical catch frame system.

Still another object of the present invention is to produce harvesting equipment of such structure that it is practical to selectively vertically harvest fruit from any desired portion of the tree without disturbing the fruit in other portions.

It is a further object of the present invention to provide means whereby the mature fruit on all portions of the tree from top to bottom and on the outer as well as the inner perimeter can be removed from the tree.

It is a further object of the present invention to provide a harvester that will accomplish the foregoing results while nevertheless being economical to construct and safe in operation.

A feature of the present invention is the utilization of the concept of imparting vertical vibratory motion to the tree sufficient to dislodge the mature fruit on a mass scale while engaging only the foliage and the secondary limbs.

Another feature of the present invention is the provision of means whereby the direction of vertical movement of the arm assembly may be reversed within preset time cycles, thereby to control the forces exerted and obtain optimum removal of fruits of different holding tenacity from different types of trees.

DRAWINGS

In the drawings used to merely illustrate a particular example of the invention.

SPECIFIC DESCRIPTION

Figure 1:
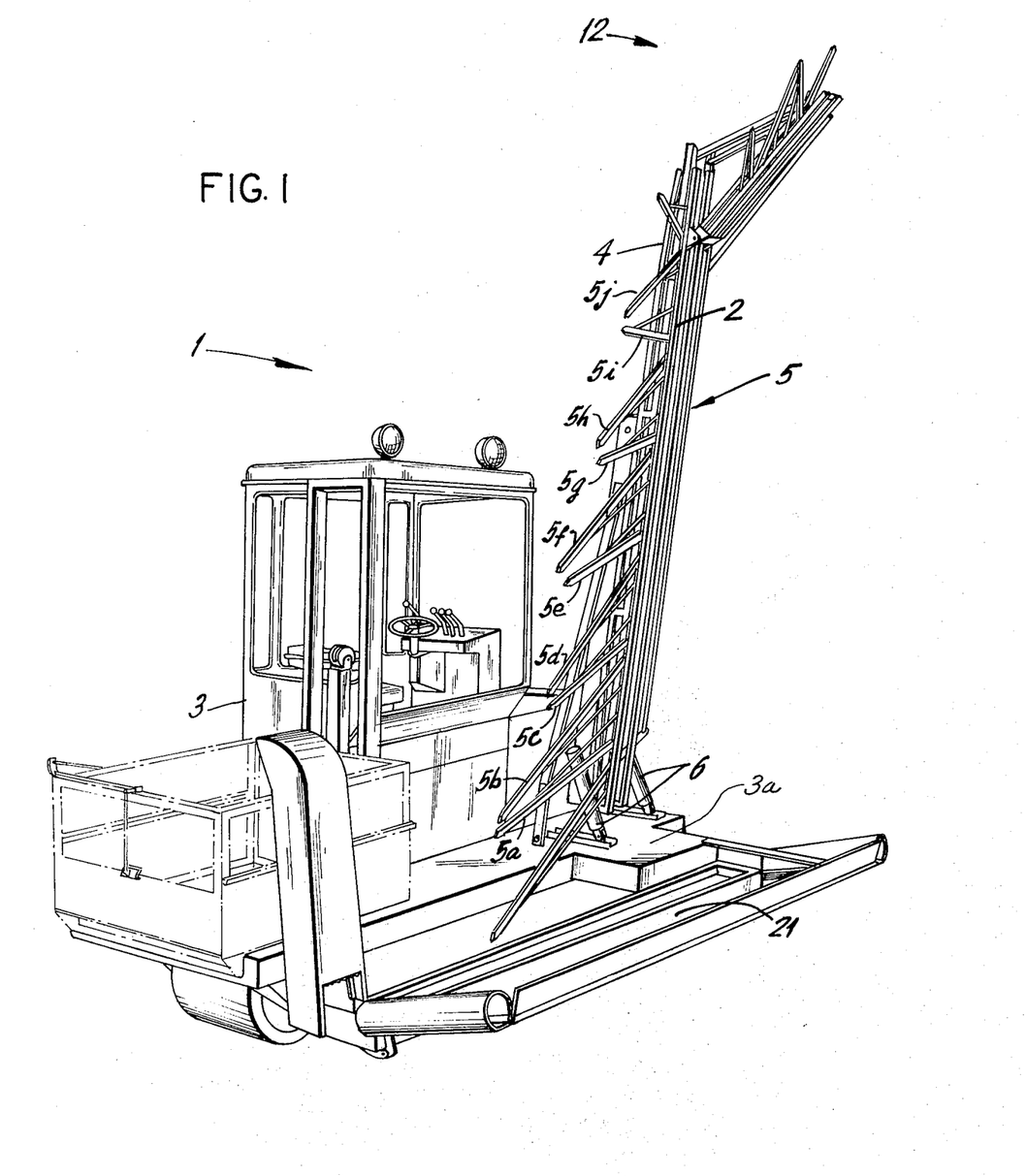
FIG. 1 represents a perspective view of a preferred form of harvesting apparatus of the present invention.

Referring now specifically to the drawings:

FIG. 1 shows the harvesting apparatus which comprises a support or pylon 2 mounted on a suitable base which is in the form of a movable tractor 3 and may be driven from place to place. As indicated, pylon 2 carries an elongate mast 4 in a position substantially perpendicular to the base 3a. The mast 4 is provided with an arm assembly 5 which is so constructed that it can extend into the tree laterally to engage the foliage and secondary limbs behind the fruit when moved into position by the tractor.

Figure 2:
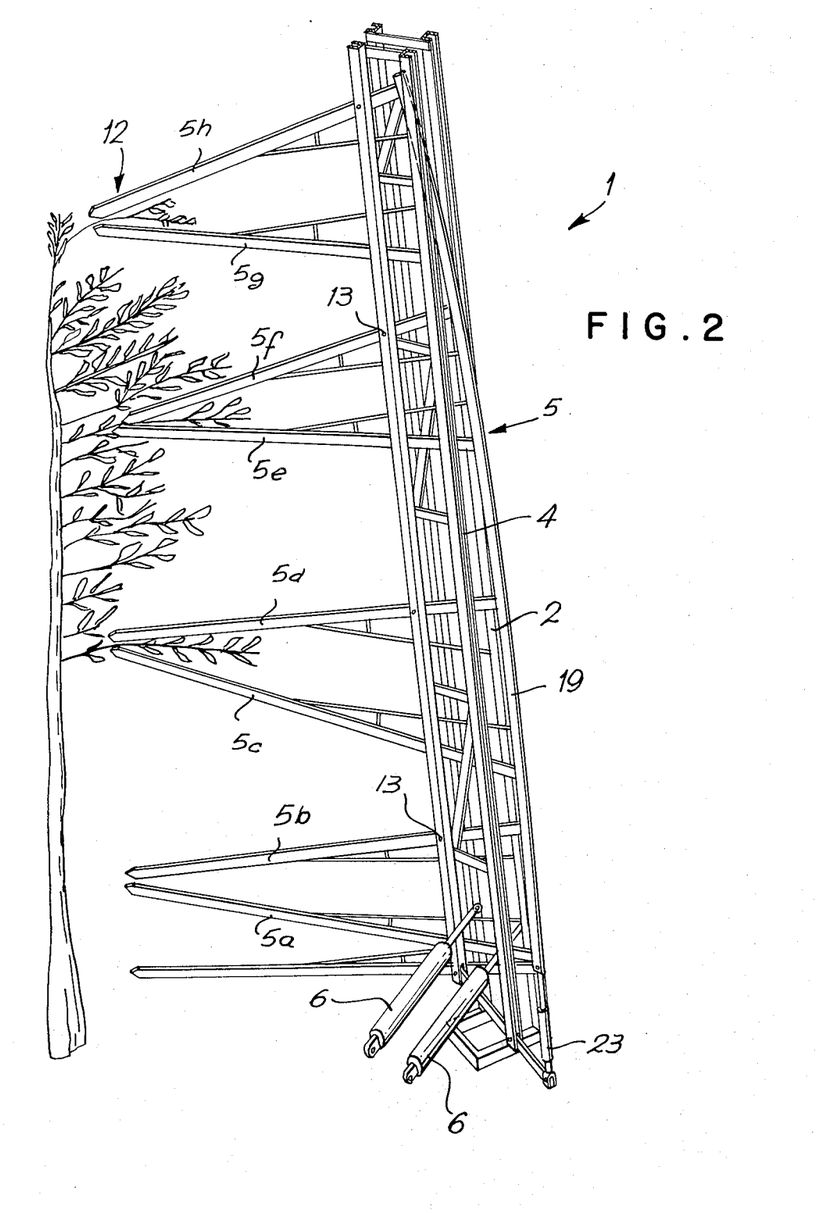
FIG. 2 is a partially transverse perspective view taken from another angle of the arm structure of FIG. 1.

The harvesting apparatus is so constructed that the arm will engage a chord of the tree covering approximately one-sixth to one-third of the circumference of the tree and all branches from the top to the bottom of the tree. While it has been found that sufficient vertical vibratory forces can be exerted to dislodge the mature fruit from the tree without moving the arm assembly 5 relative to each other, it is preferred when the arm assembly 5 are brought into the foregoing position that they be moved together to form at least a partial confinement of the foliage or secondary limbs relative to the arms. The arms 5a, 5b, 5c and 5d, 5e and 5f, 5g and 5h and 5i and 5j are moved relative to each other as shown in FIG. 2. A shaker cylinder is then rendered operative whereby the entire mast 4 and arm assembly 5 engaging foliage and secondary limbs are moved substantially vertically to shake the fruit against and toward the forces of gravity in a vertical direction. The vertical movement of the arm assembly 5 is such that the mature fruit dislodges itself from the branches. The movement, however, in no way causes damage to the tree and is such that it does not materially disturb the smaller young fruit which remains on the tree for further growth and later harvesting. The vertical movement of the complete group of arms 5 causes the mature fruit which is, of course, larger and heavier than the immature fruit, to dislodge itself from the branches and fall under the force of gravity. The vertical movement of the mast 4 is transferred through the outwardly extending arms 5 to vibrate the fruit up and down. With this occurring, the force exerted upon the fruit in the upward direction of motion exceeds the gravitational effect. The reversal of the directions of movement in the optimum manner hereinafter described disclodges the fruit from the branch.

In this apparatus the means by which the multiplicity of arms is moved up and down at a desired rate will accomplish the shaking of a substantial portion of the tree with each engagement of the foliage or secondary limb sections. In most instances the elongate upstanding mast 4 is adapted to carry a plurality of confining arms 5a through 5j of the arm assembly, which may be arranged either side by side or in vertically staggered relationship, as desired. In any event, the arms can be so extended that they engage a considerable section of the tree with the mast 4 adaptable for adjustable positioning to meet different size trees or bushes.

According to the present invention means hereinafter described are provided to prevent the transmittal of vibration to the support vehicle and the operator.

Figure 4:
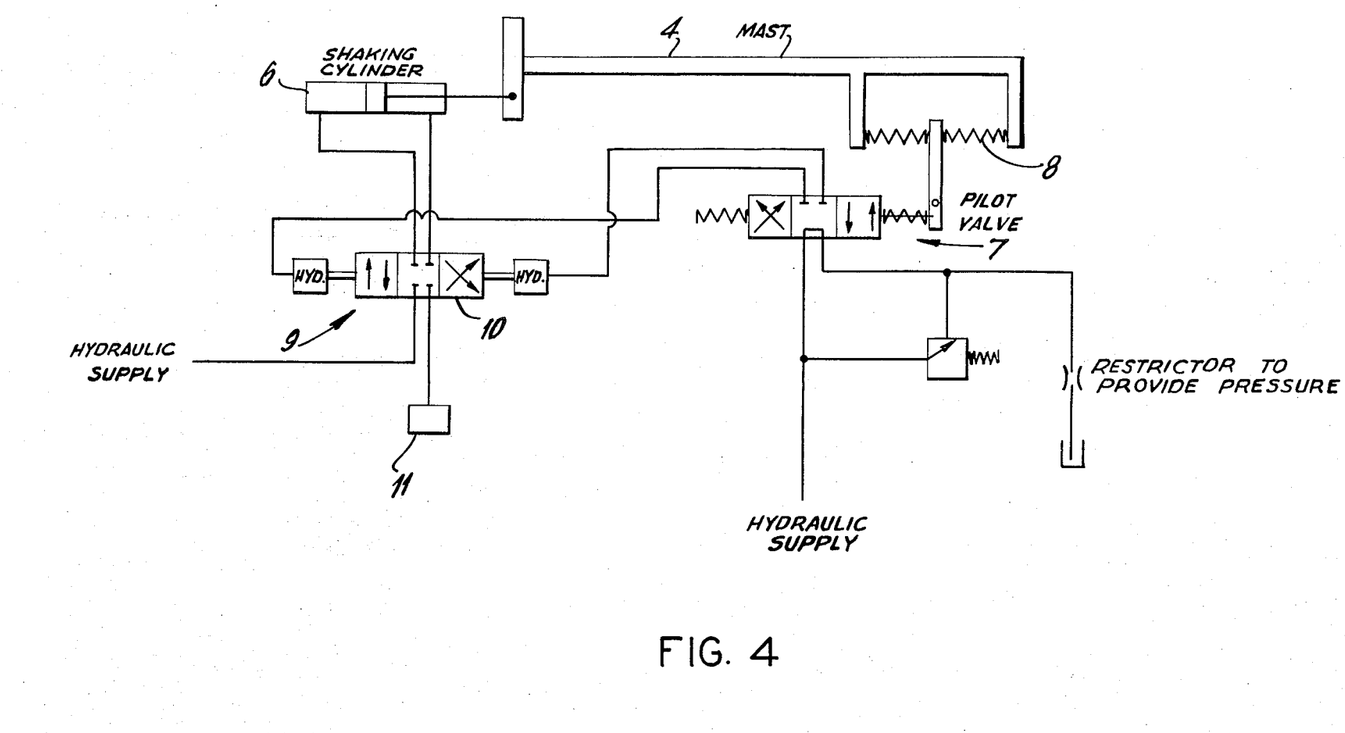
FIG. 4 is a diagrammatic view of the means for causing the reversal of movement of the arm assembly of the harvesting apparatus.

The hydraulic fluid supply is controlled by the arrangement shown in FIG. 4 which in part utilizes the standard reciprocating hydraulic system provided with a conventional shuttle valve to accomplish the reversal of flow of fluid to the shaker cylinder which is attached to the mast. This part of the arrangement is the same as described in "Oil Hydraulic Power and its Industrial Applications", Mc-Graw Hill Book Company, 1949, pages 293-295.

According to the present invention, however, a pilot valve 7 is provided which is activated against the action of the spring 8 attached to the mast 4 when the mast is at the top of its vertical movement, thereby permitting the flow therethrough of hydraulic fluid. The pilot valve is closed by the action of the spring 8 to reverse the flow when the mast is at the bottom of its vertical movement.

Further according to the present invention, the speed of reversal of the movement of the mast may be controlled by the provision of new and novel means intermediate the pilot valve 7 and the shaking cylinder 6. This means, as shown in FIG. 4, encompasses a pilot operated valve system 9 which operates through a spool 10. When the mast reaches the top of its stroke the pilot valve is activated permitting hydraulic flow to one end of the pilot operated valve 9. This immediately shifts the spool 10 which in turn permits the hydraulic flow to pass directly from a pump 11 to one end of shaking cylinder 6, the flow of fluid at high pressure causing the mast to rapidly decelerate and reaccelerate in the opposite direction. When the mast reaches the lower end of the stroke the pilot valve 7 is again activated causing hydraulic fluid to shift the spool 10 in the pilot operated valve 9 and the fluid flows to the other end of the shaking cylinder 6.

This unique construction enables a wide degree of control of the deceleration and re-acceleration rates of the mast, including control to the extent that the direction of the movement of the mast 4 may be immediately reversed as desired. As a consequence, there is almost absolute control of the time elasping between the movement of the mast 4 from one direction to the other which enables the harvester with this equipment to select whatever rate of deceleration and re-acceleration is desired. Thus, there may be accomplished a high level removal of fruit having different tenacities and attachment properties from different trees. This control is accomplished by regulating the rate of flow or pressure of the fluid passing through the pilot valve 7 and-/or by regulating the pressure of the fluid passing through the pilot operated valve 9.

While the valve system has been described in detail it will be understood that the structure is merely illustrative and that other intermediate means may be utilized to control the time of the reversal of movement of the mast, such as a pilot operated servo hereinafter described.

As shown, the arms from the base of the mast to the upper portion are preferably so disposed that the movable arm assembly close upwardly to engage into the foliage and secondary limbs. The upper portion 12 of the mast is preferably offset inwardly with the movable arms closing downwardly toward the stationary arms. This enables the shaker to grasp the upper portion of a tree which in its natural shape is conical. With this unique structure it will be appreciated that it becomes relatively simple to cover the entire tree area in a minimal time.

After sufficient time is expended to remove substantially all of the fruit within one area or region of the tree or bush, the complete apparatus is moved to another section of the tree, and the process is repeated.

It is to be noted that with the present system only the fruit from a selective portion of the tree will be dislodged. The fruit on the remainder of the tree will not be significantly removed or disturbed. As a consequence, not only is selective harvesting possible with the use of the present invention, but also a simple, practical and economical catch frame structure can be utilized which need only be present under the portion of the foliage and/or secondary limbs that are being directly vibrated by the apparatus.

The vehicle 3 according to the present invention is provided with means for turning the front wheels of conventional heavy duty type for steering independently of the rear wheel and vice versa. These means comprise separate hydraulic systems (not shown) which enable the vehicle to have complete maneuverability in order to properly insert the arms into the tree despite the minimum spacing between trees, a condition which is usually encountered in the groves.

Figure 3:
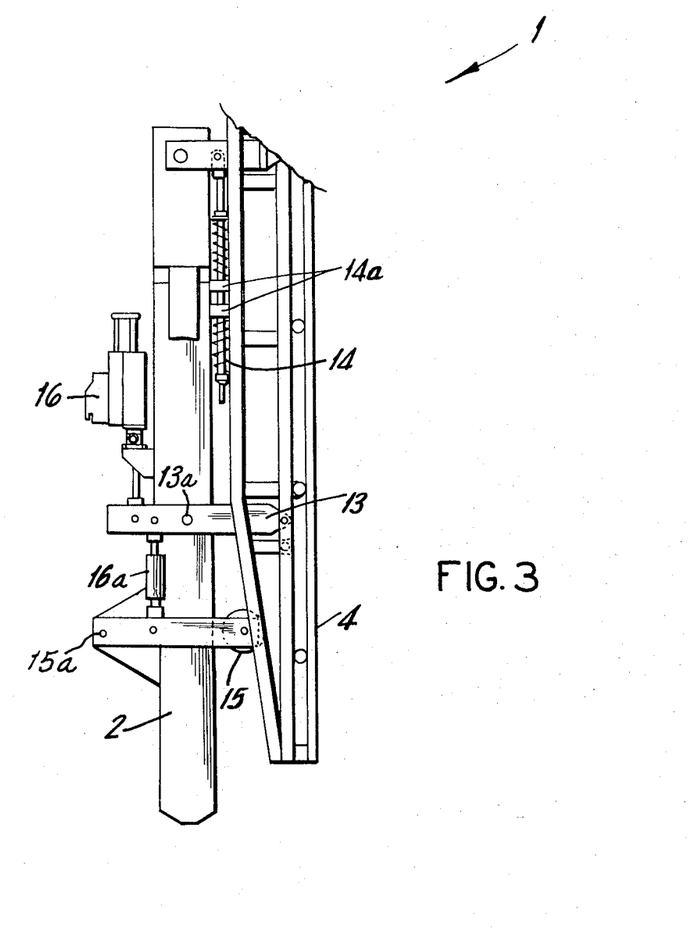
FIG. 3 is a perspective view of a section of the pylon and mast assembly of the harvesting apparatus of the present invention.

The means of accomplishing the foregoing highly desirable results are outlined in detail in FIGS. 2 and 3. It will be understood, however, that the specific descriptions and illustrations being set forth will merely illustrate the concept of the present invention and does not in any way limit the scope thereof. The structure illustrated comprises a pylon 2 which is anchored to the support vehicle 3. The pylon is a member which provides torsional and horizontal support for the mast and arm assemblies. As shown in FIG. 2, it is a channel member carrying the arms. As shown in FIG. 3, it is a tubular member supporting the arms through pivot links 13. The pylon is numbered 2 throughout this specification and drawings, as its function is the same in no matter what form. Pivotally mounted on the pylon 2 are a series of links 13, one end of each of which is pivotally secured to the mast which carries the arm structure. A shaker cylinder or cylinders 16 which operate as hereafter described is fastened to the other end of one or more of said links. A spring 14 may be held by the extensions 14a from the pylon 2 only so that when the springs are compressed to a certain point and then released they will assist in the downward movement or reversal of movement of the shift accomplished by the shaker cylinder 16, whereby the horsepower required by the shaker cylinder 16 is considerably lessened by the energy stored by the spring 14.

When the cylinders are activated they will cause the links 13 to pivot around the pylon 2 and move the mast 4 in a substantially upward and downward direction. The vibration imparted by the movement is passed through the arm assembly 5 to the foliage and secondary limbs of the tree, as shown in FIG. 3.

It will be understood that the vibratory forces could be transferred to the vehicle and operator. However, according to the present invention, a unique counterweight 15 is provided to balance the force exerted by the shaking mast and prevent the transmittal of vibration to the supporting vehicle 3 and operator.

As shown in FIG. 3, the operation is as follows: As cylinder 16 is moved downwardly, mast 4 rises by the movement of link 13 around pivot 13a. The movement of link 13 causes the rod 16a to exert downward pressure and the counterweight 15 moves downwardly about pivot 15a counterbalancing any potential reaction which might otherwise be transmitted to the vehicle 3.

It will be understood that while pivotal movement of the links 13 to shake the mast 4 has been heretofore described, this is merely to illustrate one form of structure which may be used to vibrate the machine. For example: The mast 4 may be slidably mounted on the pylon 2 or other connections between the pylon 2 and the mast 4 may be used to accomplish the same result.

As shown in FIG. 2, the arm assembly 5 comprises a series of alternately extending arms which are alternately secured to and slidably guided by the elongate mast. A cylinder or cylinders 16 are provided which are attached to movable arms which are slidably carried by the mast 4. The slidably movable arms 5b, 5d, 5f and 5h are movable in relation to the adjacent arms 5a, 5c, 5e and 5g. This movement is caused by the action of cylinder 23 which moves rod 19 (shown partially in FIG. 2.) upwardly and downwardly. Rod 19 is pivotally connected only to arms 5b, 5d, 5f, and 5h and thereby moves these arms into a position whereby they clamp against the adjacent arms, each of which is attached to the elongate mast 4 in a fixed position by bolting or by any other suitable means.

When the arm assembly 5 is inserted in the tree, the arms 5b, 5d, 5f, 5h, 5j and 5a, 5c, 5e, 5g, 5i are apart and separated. Spring 20 are provided so that when the arms are being inserted into the tree they may move upward or downward against the action of the spring 20 in the event they engage a blocking large limb or other obstacle.

After the arms are properly inserted in the tree to engage the foliage and/or secondary limbs, the cylinder 16 is activated causing the slidable arms 5b, 5d, 5f, 5h, to pivot and move towards the arms 5a, 5c, 5e, 5g, thereby to confine the masses of foliage and/or secondary limbs within the confines of these arms. The entire arm structure 5 is then vibrated by the means heretofore described in the substantially vibratory upward and downward direction.

All those fruit pieces which are dislodged from the branches then fall gravitationally into a suitable collecting catch frame 21 so constructed that the fruit will roll or move to a small conveying area and then be collected.

Figure 5:
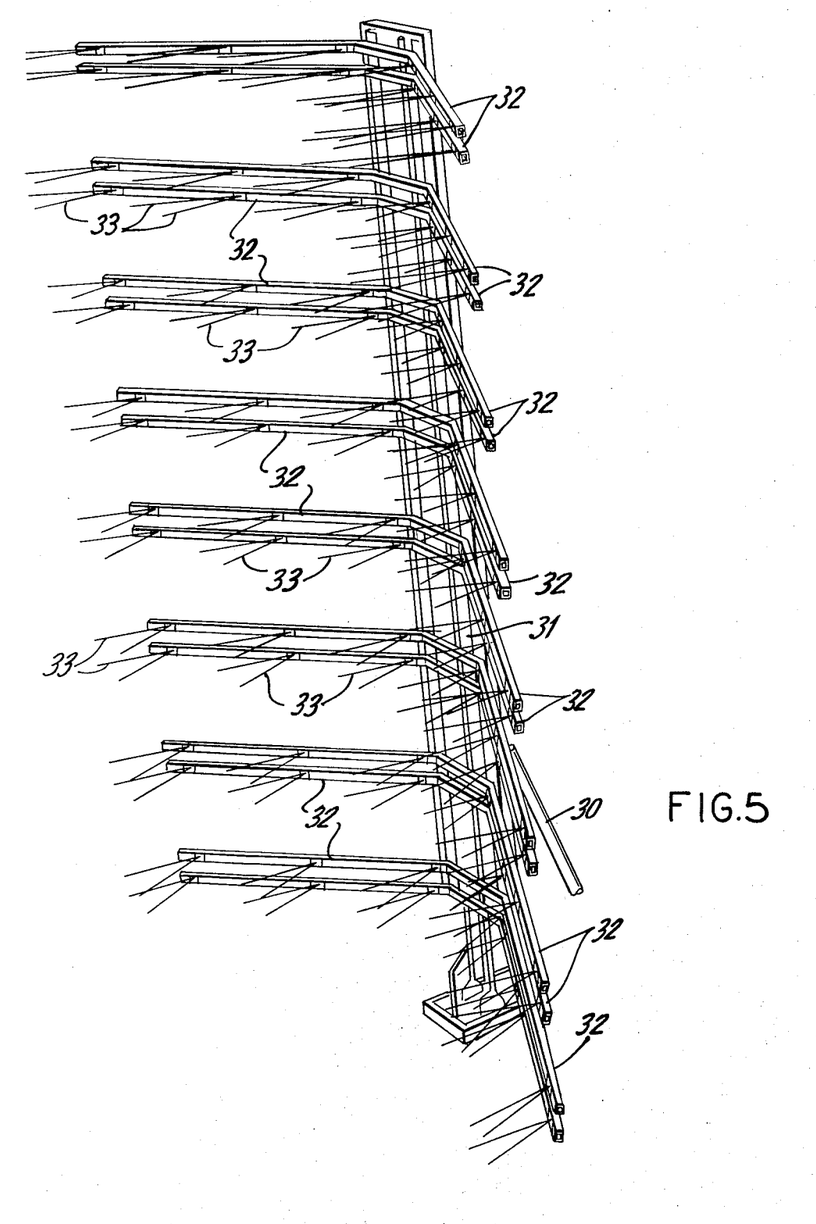
FIG. 5 is a perspective view of the arm assembly of a modified form of the harvesting apparatus of the present invention.

A modified form of the arm assembly of the present invention is shown in FIG. 5. While the pylon and mast arrangement of the modification of the invention disclosed in FIG. 1 can be equally utilized with the modification of FIG. 5, there is shown a shaking mechanism comprising a cam operated piston 30 which is affixed to the mast 31 causing the mast to vibrate in a substantially vertical direction. The mast is provided with a series of elongate offset arms 32. The arms are caused to move together by a cylinder 23 such as that illustrated by FIG. 2, if desired, to surround the foliage and secondary limbs therebetween with the foliage being held within alternate arms. The shaking of the arms in a substantially vertical direction would suffice to remove the mature fruit from the tree. However to assist in such removal prongs 33 are provided on the arms. The prongs are so arranged that they too can engage portions of the foliage interiorly of the tree to shake the same and cause fruit removal.

Figure 6:
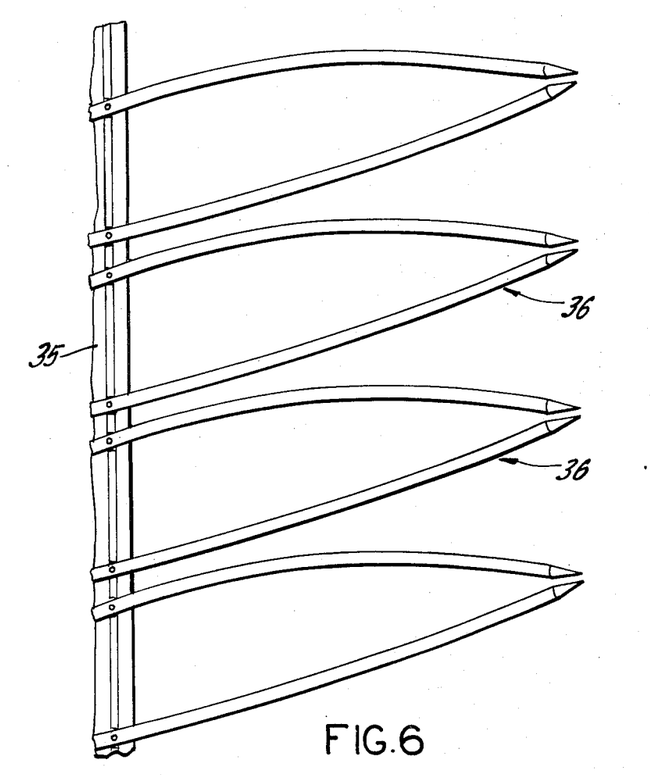
FIG. 6 is a perspective view of the arm assembly of another modified form of the present invention.

In the modification of the invention shown in FIG. 6 a mast 35 which is vibrated in a substantially vertical direction as the mast of FIG. 1 is provided with triangular shaped extensions or arms 36 which do not move towards each other. In this construction the extensions or arms are inserted into the tree and the loop formed by alternate arms surrounds the foliage and secondary limbs. When vibrated in a substantially vertical direction, as aforesaid, the arrangement will cause the removal of the mature fruit.

Figure 7:
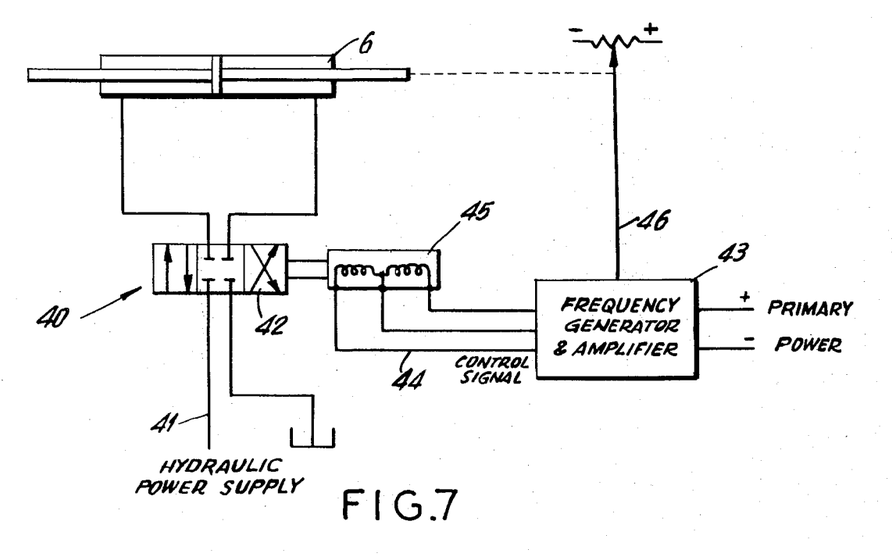
FIG. 7 is a diagrammatic view of a modified form of the means for causing the reversal of movement of the arm assembly of the harvesting apparatus.

As shown by FIG. 7, the servo system comprises a control or servo valve 40, which is generally analogous to valve 9 of FIG. 4. The valve is provided with a hydraulic supply line 41 to furnish the fluid to be directed into the cylinder 6, in a fashion similar to that shown by FIG. 4. This valve 40 also comprises a spool 42 (like spool 10 of FIG. 4) which shifts between two limiting positions to permit the hydraulic fluid to enter the cylinder 6 from one side and leave the cylinder to the pump 11 from the other side, as in FIG. 4.

The operation is timed to the desired frequency by the combined frequency generator and amplifier combination, conventionally shown at 43. Various forms of control circuitry may be used for this purpose and without in any respect limiting the type of operation, one operational form may be by way of some type of suitable flip-flop type of circuit. A circuit of this type can be caused to feed current in one direction or the other through conductors 44 to energize or de-energize the conventionally shown windings 45. Such windings then can be used to move the spool in one direction or the other between its limiting positions.

Such a circuit may comprise, for instance, a multivibrator which is capable of being tripped to one position or another, with the tripping or control pulse applied by way of a movement of the mast 4 to its extreme positions. In one such position the mast movement may supply a control pulse by way of conductor 46 into some suitable type of pulse-forming oscillator which will serve to trigger or trip a multi-vibrator, whose output in each direction is amplified and set to control the spool position. Suitable time constants of operation may readily be selected for such purpose.

While many forms of such circuitry are known it may be noted that the text "Pulse and Digital Circuits" by Millman and Taub, published by McGraw-Hill Book Company, Inc. of New York (1956 Edition) describes fully a suitable multi-vibrator device and triggering therefor. Reference here may be made particularly to pages 174 through 180 for the multi-vibrator and to pages 360 to 362 in particular for a tripping by a blocking oscillator, although various other portions of this text explain fully various other forms of triggering and pulse width control circuitry.

With this type of electrical control it is readily apparent that the mast movement may thus also establish another form of control which in many instances is to be preferred because of the simplicity of control.

While the invention has been described in detail and in connection with certain modified forms, it is to be understood that the description is merely for illustrative purposes and references to orange harvesting are meant to include all crop from trees and bushes utilizing the novel features of the invention as set forth in the appended claims.

What is claimed is:

1. A harvesting device for automatically removing mature products from a tree, comprising: a support structure; an elongate mast carried from the support and extending substantially vertically from the support for a substantial portion of its length; a plurality of generally parallelly positioned arms extending outwardly along a plane substantially normal to the mast and being spaced relative to each other; means connected to said support to move the arms to a position internally of the tree foliage and branches; means connected to at least one of each two adjacent arms to move said arm relative to the other arm to cause the outer end of the movable arm to approach the outer end of the fixed arm so that tree foliage and secondary limbs are held between the arms; and means for imparting vibrational movement of the arms on the mast to effect a loosening and removal of the growths from the region of the tree into which the arms are moved.

2. The invention as defined in claim 1 including balancing means for preventing the transmittal of vibration to the movable vehicle.

3. The invention as defined in claim 2 in which said balancing means comprise a counterweight.

4. The invention as defined in claim 1 in which the upper portion of the mast is inwardly offset.

5. The invention as defined in claim 1 in which the upper portion of said arms are inwardly offset.

6. The invention as defined in claim 1 including, in addition, a catch frame to receive the fruit as it is released from the tree or bush.

7. The invention as defined in claim 6 including a movable vehicle on which the catch frame and mast are carried.

8. The invention as defined in claim 7 including a conveyor for conveying the fruit from the catch frame.

9. The invention as defined in claim 1 including, in addition, a support for said mast.

10. The invention as defined in claim 1 including control means for controlling the reversal of the direction of the substantially vertical movement of said mast.

11. The invention as defined in claim 10 including a pilot valve, a shaking cylinder and control means disposed therebetween.

12. The invention as defined in claim 11 in which said control means comprise a pilot operated valve provided with movable spools.

13. The invention as defined in claim 1 including resilient means secured to said arms to cause said arms to yield whereby forces exerted by the arms on the foliage and secondary limbs are limited to prevent damage to the tree.

* * * * *